(12) United States Patent
Andruskova et al.

(10) Patent No.: US 7,928,265 B2
(45) Date of Patent: Apr. 19, 2011

(54) ANTIOXIDANT COMPOSITIONS OF OCTYLATED DIPHENYLAMINES AND METHOD OF THEIR PREPARATION

(75) Inventors: Viera Andruskova, Sala (SK); Jan Uhlar, Sala (SK); Peter Lehocky, Nitra (SK); Jaroslav Horak, Sala (SK)

(73) Assignee: Duslo A.S., Sal'a (SK)

( * ) Notice: Subject to any disclaimer, the term of this patent is extended or adjusted under 35 U.S.C. 154(b) by 786 days.

(21) Appl. No.: 11/418,785

(22) Filed: May 5, 2006

(65) Prior Publication Data

US 2006/0205981 A1   Sep. 14, 2006

Related U.S. Application Data

(63) Continuation-in-part of application No. PCT/SK2004/000013, filed on Nov. 25, 2004.

(30) Foreign Application Priority Data

Nov. 25, 2003   (SK) .................... 1456-2003

(51) Int. Cl.
C07C 209/60   (2006.01)

(52) U.S. Cl. ........ 564/408; 564/409; 564/433; 564/437; 508/563; 502/65; 502/68; 502/84

(58) Field of Classification Search ............ 564/408, 564/409, 433, 437; 502/65, 68, 84; 508/563
See application file for complete search history.

(56) References Cited

U.S. PATENT DOCUMENTS

| | | | |
|---|---|---|---|
| 2,943,112 A | 6/1960 | Popoff et al. | 260/576 |
| 2,990,394 A | 6/1961 | Ainsworth | 260/45.8 |
| 3,414,618 A | 12/1968 | Randell | 260/576 |
| 3,714,258 A | 1/1973 | Bagha et al. | 260/576 |
| 4,146,687 A | 3/1979 | Reale et al. | 521/107 |
| 4,163,757 A | 8/1979 | D'Sidocky et al. | 260/570 |
| 4,226,947 A | 10/1980 | Yukuta et al. | 521/107 |
| 4,824,601 A | 4/1989 | Franklin | 252/401 |
| 4,837,259 A | 6/1989 | Chucla | 524/258 |
| 5,214,211 A * | 5/1993 | Kurek et al. | 564/409 |
| 5,413,737 A | 5/1995 | Evan | 252/405 |
| 5,520,848 A | 5/1996 | Evan | 252/405 |
| 5,672,752 A | 9/1997 | Lai | 564/409 |
| 5,750,787 A * | 5/1998 | Lai et al. | 564/409 |
| 6,315,925 B1 | 11/2001 | Aebli et al. | 252/401 |

FOREIGN PATENT DOCUMENTS

| | | |
|---|---|---|
| CS | 226248 | 2/1986 |
| CS | 261085 | 5/1989 |
| RU | 443016 | 9/1974 |

OTHER PUBLICATIONS

International Search Report for PCT/SK2004/000018.

* cited by examiner

Primary Examiner — Ling-Siu Choi
Assistant Examiner — Bijan Ahvazi
(74) Attorney, Agent, or Firm — Ohlandt, Greeley, Ruggiero & Perle, LLP; George W. Rauchfuss, Jr.

(57) ABSTRACT

Method of preparation of antioxidant composition on the basis of diphenylamine by catalytic alkylation of diphenylamine by an threefold excess of diisobutylene with regard to diphenylamine in the presence of an alkylation catalyst t in an amount of 5 to 30% by weight, as referred to diphenylamine, at a temperature of 140 to 160° C. Water contained in the catalyst, is removed and subsequently diphenylamine is left to complete the reaction with diisobutylene and after the reaction is finished, the reaction mixture is separated from the catalyst, unreacted diisobutylene is removed from it and the reaction product is obtained.

18 Claims, No Drawings

ANTIOXIDANT COMPOSITIONS OF OCTYLATED DIPHENYLAMINES AND METHOD OF THEIR PREPARATION

RELATED APPLICATIONS

This application is a CIP application of PCT Application No. PCT/SK2004/00013, filed Nov. 25, 2004, claiming priority from Slovak application No. PP-1456-2003, filed Nov. 25, 2003

FIELD OF THE INVENTION

The invention concerns antioxidant compositions based on octylated diphenylamines, as well as a method of preparation thereof. Compositions in question can be used as effective stabilizers for polymeric materials, lubricants and oils. They are used as additives for stabilization of organic products which undergo oxidative, thermal or light induced degradation.

BACKGROUND TO THE INVENTION

Most of industrially produced polymeric materials, oils and lubricants need the presence of intentionally added substances to ensure required stability during their processing, storing and using in finished articles. These substances retard or inhibit undesirable oxidation phenomena in a given substrate, so that they prevent complete deterioration by the influence of oxygen, increased temperature, UV radiation and mechanical stress.

The above requirements are met by substances showing anti-oxidative effect. To the best-known and most often used of these, there belongs the group of aminic anti-degradants, for example N-phenyl-1-naphthylamine, N-(4-tert-octylphenyl)-naphthylamine, N-(1,3-dimethylbutyl)-N'-phenyl-p-phenylenediamine, N-isopropyl-N'-phenyl-p-phenylenediamine (CS AO 261 085 and CS AO 226 248). They can be easily modified and it is possible to obtain substances having properties required for a broad spectrum of various materials; as well as processing and exploitative conditions of use.

Alkylated diphenylamines are effective in oils, lubricants for turbine machines, aircrafts and everywhere, where there is high working temperature, and in combination with other additives they ensure high anti-oxidative and thermal protection (CS AO 226 248, U.S. Pat. No. 3,414,618). They are usually slightly colouring, resistant against further turning yellow in comparison with unsubstituted diphenylamine, which besides the anti-oxidative properties tends to turn yellow in rubber mixtures.

Alkylated diphenylamines are most often prepared by typical Friedel-Crafts reaction of alkylation of aromatic amines by olefins. Industrial alkylations utilise the typical Friedel-Crafts catalyst $AlCl_3$. Also other catalysts, like for example $H_2SO_4$, anhydrous HF, $H_3PO_4$ on carriers, various aluminosilicates, zeolites, pillared clays, are suitable. Advantages of $AlCl_3$ are its high catalytic activity and insolubility in organic substances, disadvantages are its high sensitivity to the presence of water, corrosive properties, demanding way of removing it from the reaction mixture, as well as that a great amount of waste-waters arises, presence of chlorine in the products and presence of undesirable, by-products, including those which are alkylated at nitrogen.

$AlCl_3$ belongs to efficient alkylation catalysts for diphenylamine which, besides the fact that it accelerates alkylation to positions 4, 4' of diphenylamine, catalyses also cleaving reactions provided the reactant is diisobutylene. There arise tert-butyl derivatives and in the subsequent reactions considerable amounts of trioctyldiphenylamine, thus causing decrease in the amount of the desirable 4,4'-dioctyldiphenylamine. This weak points are partially solved by using catalysts based on bentonite (U.S. Pat. No. 6,315,925). Use of some aluminosilicates without preceding activation is described in SU 443 026. Disadvantages of this process are low activity of the catalyst and its variable quality, even if from one source. Natural aluminosilicates are also activated by an acid to increase their catalytic efficiency (U.S. Pat. Nos. 2,943,112, 4,163,757, 4,824,601). The disadvantages of using catalysts based on bentonite according to the above U.S. patents are low concentration of 4,4'-dioctyldiphenylamine and high content of unreacted diphenylamine—up to 5%.

Alkylation of aromatic amines is performed by alkylating agents which are prevailingly constituted by olefins, especially isobutene, diisobutylene, nonene, styrene, alphamethylstyrene (U.S. Pat. Nos. 2,943,112, 3,714,258, published SK PP 743-98); the alkene may further be pentene-1, hexene-1, heptene-1, octane-1, nonene-1 or their mixtures. Alkylation of aromatic amines by, for example, nonene is described in SK PP 743-98, where four- to tenfold mole excess of nonene, referred to diphenylamine, is used for preparation of the resulting product, and the alkylation is performed at a temperature of 150 to-220° C. The disadvantages of this method are the relatively high temperature and high excess of nonene which must be subsequently removed from the reaction mixture for the purpose of regeneration, thus together with the high reaction temperature increasing the production costs.

In U.S. Pat. No. 5,672,752, there is described the use of a catalyst based on bentonite which is preferred in the process of monoalkylation over dialkylation at specific conditions, like temperature and mole ratio of diphenylamine to diisobutylene (DFA: DIB). A disadvantage of this method is the fact that it does not provide a product having the required amount of 4,4'-dioctyldiphenylamine. Alkylation of DFA by diisobutylene using activated aluminosilicate, is described in U.S. Pat. No. 5,520,848. Synthesis of 4,4'-dioctyldiphenylamine from DFA and DIB with its content less than 25% in the reaction mixture using activated clay, like the catalyst Fulcat 22B, is described in U.S. Pat. No. 4,824,601. Nevertheless, the reaction product still contains 10% of unreacted DFA.

Moreover, a disadvantage of all above processes is, as already mentioned, relatively low concentration of 4,4'-dioctyldiphenylamine—less than 30%.

The aim of the present invention is to present a method of preparation of antioxidant composition on the basis of diphenylamine.

SUMMARY OF THE INVENTION

The invention concerns a method of preparation of antioxidant composition on the basis of diphenylamine by catalytic alkylation of diphenylamine by an excess of diisobutylene in the presence of an alkylation catalyst. The catalytic alkylation of diphenylamine is performed with threefold excess at most of diisobutylene with regard to diphenylamine in the presence of acidic clay as a catalyst in an amount of 5 to 30% by weight, as referred to diphenylamine, at a temperature of 140 to 160° C. Water contained in the catalyst, is removed and subsequently diphenylamine is left to complete the reaction with diisobutylene and after the reaction is finished, the reaction mixture is separated from the catalyst, unreacted diisobutylene is removed from the reaction product containing antioxidant composition is obtained.

The catalytic alkylation of diphenylamine is performed at atmospheric pressure, in the course of 18 to 28 hours, advantageous at overpressure of up to 0.6 MPa.

It is preferred when the catalytic alkylation of diphenylamine is performed in the presence of a catalyst chosen from the group including Nobelin FF, Nobelin GF, Jeltar 100, Jeltar 300, catalyst K5, K10 Süd Chemie, Fulcat 22B. The unreacted diisobutylene and possibly present low boiling components are removed by azeotropic distillation.

It is also preferred, when the catalyst is reused after separation from the reaction medium or without its separation in a further batch with or without addition of new catalyst, wherein the catalyst is used in the second to ninth batch and the amount of new catalyst added is from 0.01 to 70% by weight, as referred to the catalyst charge in the first alkylation batch, and when the reaction product is further processed by rectification on a packed column at a temperature of 148 to 153° C. and a pressure of 8 to 10 Pa.

Further, it is also preferred if the reaction product is left to crystallize from a solvent chosen from the group including ethanol, isopropanol, cyclohexanol, cyclohexane, diisobutylene and methanol, or from a mixture of these solvents or the reaction product is extracted by one or more solvents chosen from the group including ethanol, isopropanol, cyclohexanol, cyclohexane, diisobutylene and methanol.

An advantage of the method of preparation of antioxidant compositions on the basis of diphenylamine according to the present invention consists in the need of lower mole excess of the alkylating agent or of its mixture, as compared with the process of production of mixtures from higher alkenes (SK PP 743-98), despite the fact that diisobutylene has a branched chain and may undergo cleaving, this being allowed by softer reaction conditions. The softer reaction conditions and the need to remove smaller amount of unreacted diisobutylene allow both to obtain preferred antioxidant compositions from the point of view of purity and content of components in the positions 4 and 4,4' of diphenylamine, and they are making the technology cheaper.

A further advantage is the fact that the catalyst may be reused after separation from the reaction medium or without its separation in the next batch with addition or without addition of new catalyst. The catalysts used in this production method may be removed from the reaction mixture by filtration, centrifugation or decantation, and they may be used again in the catalytic reaction of diphenylamine alkylation by diisobutylene. The used catalyst is reused in a second to ninth batch, and the added amount of new catalyst ranges from 0.01% by weight to 70% by weight, as referred to the catalyst charge in the first alkylation batch.

An advantage of the method according to the present invention is also the fact that the reaction is performed without addition of organic solvents. The desired chemical composition of the resulting mixture is obtained after alkylation by processing—distilling off lower boiling components at an atmospheric or lowered pressure, rectification, extraction and/or crystallization using a solvent or extraction agent. Methanol, ethanol, isopropanol, cyclohexanol, cyclohexane and/or diisobutylene are suitable as solvents.

The invention concerns also antioxidative composition on the basis of diphenylamine prepared by the above-mentioned method of preparation, wherein the antioxidative composition contains 65 to 98% by weight of dioctyldiphenylamine, up to 29% by weight of monooctyldiphenylamine, up to 5% by weight of octylbutyidiphenylamine, up to 1.5% by weight of trioctyldiphenylamine and up to 1% by weight of diphenylamine.

DETAILED DESCRIPTION OF THE INVENTION

To the nature of the invention belongs also composition, containing 83 to 89% by weight of dioctyidiphenylamine, 7 to 13% by weight of monooctyidiphenylamine, 0.8 to 4% by weight of octylbutyidiphenylamine, 0.1 to 1.5% by weight of trioctyldiphenylamine and 0.1 to 1% by weight of diphenylamine.

It has been found that it is preferred, if the antioxidative composition contains 92 to 94.5% by weight of dioctyldiphenylamine, 2.5 to 4.5% by weight of monooctyldiphenylamine, 1.4 to 2% by weight of octylbutyldiphenylamine, 0.3 to 1% by weight of trioctyldiphenylamine and up to 0.5% by weight of diphenylamine. It is also preferred, if the antioxidative composition contains 96 to 98% by weight of dioctyldiphenylamine, 0.6 to 2.1% by weight of monooctyidiphenylamine, 0.8 to 1.1% by weight of octylbutyidiphenylamine, 0.1 to 0.5% by weight of trioctyldiphenylamine and up to 0.3% by weight of diphenylamine.

Further, it has been found a mixture preparation of stabilized polymeric materials which contains at least one above-mentioned antioxidant composition.

An advantage of antioxidant compositions according to the present invention is the fact that they have highly reduced content of trioctyldiphenylamine and very low content of diphenylamine (trioctyldiphenylamine and diphenylamine reduce the antioxidant efficiency of antioxidant compositions and, moreover, diphenylamine imparts undesired properties, for example toxicity, to the products). Thus, the increased purity of the composition manifests itself by better protective action in rubber mixtures.

Also the fact that the compositions in question occur in solid state, may be considered as an advantage, this being preferred especially from the point of view of storage ability and transport.

The above problem is solved by antioxidant compositions of octylated diphenylamines according to the present invention, the nature of which consists in that the composition contains 65 to 98% by weight of dioctyldiphenylamine, at most 29% by weight of monooctyldiphenylamine, maximum 5% by weight of octylbutyldiphenylamine, maximum 1.5% by weight of trioctyidiphenylamine and maximum 1% by weight of diphenylamine, while the rest consists of cleavage products of diisobutylene with diphenylamrine.

To the nature of the invention belongs also composition, containing 83 to 89% by weight of dioctyldiphenylamine, 7 to 13% by weight of monooctyldiphenylamine, 0.8 to 4% by weight of octylbutyidiphenylamine, 0.1 to 1.5% by weight of trioctyldiphenylamine and 0.1 to 1% by weight of diphenylamine, as well as composition, containing 92 to 94.5% by weight of dioctyldiphenylamine, 2.5 to 4.5% by weight of monooctyldiphenylamine, 1.4 to 2% by weight of octylbutyldiphenylamine, 0.3 to 1% by weight of trioctyidiphenylamine and maximum of 0.5% by weight of diphenylamine, and composition, containing 96 to 98% by weight of dioctyidiphenylamine, 0.6 to 2.1% by weight of monooctyldiphenylamine, 0.8 to 1.1% by weight of octylbutyldiphenylamine, 0.1 to 0.5% by weight of trioctyldiphenylamine and maximum of 0.3% by weight of diphenylamine.

It has been found that it is preferred, if the composition of octylated diphenylamines contains at least 83% by weight of dioctyldiphenylamine, up to 10% by weight of monooctyldiphenylamine, up to 4% by weight of octylbutyldiphenylamine, up to 1.5% by weight of trioctyldiphenylamine and up to 1% by weight of diphenylamine.

It is also preferred, if the composition contains at least 92% by weight of dioctyldiphenylamine, up to 5% by weight of monooctyldiphenylamine, up to 2% by weight of octylbutyldiphenylamine, up to 1% by weight of trioctyldiphenylamine and up to 0.5% by weight of diphenylamine.

Even more preferred are antioxidant compositions, containing at least 95% by weight of dioctyldiphenylamine, up to 2% by weight of monooctyldiphenylamine, up to 1% by weight of octylbutyidiphenylamine, up to 0.5% by weight of trioctyldiphenylamine and maximum of 0.3% by weight of diphenylamine.

The invention concerns also a method of preparation of an antioxidant composition of octylated diphenylamines by catalytic alkylation of diphenylamine by alkene in the presence of an alkylation catalyst, the nature of which consists in that the catalytic alkylation of diphenylamine is performed by diisobutylene with an excess of diisobutylene with regard to diphenylamine, in the presence of acidic clay as a catalyst in an amount of 5 to 30% by weight, as referred to diphenylamine, at a temperature of 140 to 160° C. Water contained in the catalyst, is removed, subsequently diphenylamine is left to complete the reaction with diisobutylene and after the reaction has been finished, the reaction mixture is separated from the catalyst, and unreacted diisobutylene is removed from the reaction product containing octylated diphenylamines.

The catalytic reaction of diphenylamine alkylation by diisobutylene is performed at an atmospheric pressure or overpressure of up to 0.6 MPa, at a concentration of the catalyst of 5 to 30% by weight.

Suitable catalysts are activated acidic clays based on a layered silicate, for example montmorillonite, activated by mineral acids, like sulphuric acid or hydrochloric acid, in which the content of humidity is preferably less than 10%, for example commercially available types with the designations Fulcat 22B, acidic clays K5, K10, Jeltar 100, Jeltar 300 or Nobelin FF and Nobelin GF.

An advantage of the method of preparation of antioxidant compositions of octylated diphenylamines according to the present invention consists in the need of lower mole excess of the alkylating agent or of its mixture, as compared with the process of production of mixtures from higher alkenes (SK PP 743-98), despite the fact that diisobutylene has a branched chain and may undergo cleaving, this being allowed by softer reaction conditions. The softer reaction conditions and the need to remove smaller amount of unreacted diisobutylene allow both to obtain preferred antioxidant compositions from the point of view of purity and content of components in the positions 4 and 4,4' of diphenylamine, and they are making the technology cheaper.

A further advantage is the fact that the catalyst may be reused after separation from the reaction medium or without its separation in the next batch with addition or without addition of new catalyst. The catalysts used in this production method may be removed from the reaction mixture by filtration, centrifugation or decantation, and they may be used again in the catalytic reaction of diphenylamine alkylation by diisobutylene. The used catalyst is reused in a second to ninth batch, and the added amount of new catalyst ranges from 0.01% by weight to 70% by weight, as referred to the catalyst charge in the first alkylation batch.

An advantage of the method according to the present invention is also the fact that the reaction is performed without addition of organic solvents. The desired chemical composition of the resulting mixture is obtained after alkylation by processing—distilling off lower boiling components at an atmospheric or lowered pressure, rectification, extraction and/or crystallization using a solvent or extraction agent. Methanol, ethanol, isopropanol, cyclohexanol, cyclohexane and/or diisobutylene are suitable as solvents.

The products of the described production method—antioxidant compositions with high degree of conversion of the starting diphenylamine—are easily separable from the used catalyst thanks to the used catalytic system and reaction conditions also with very low content of trialkylated diphenylamines. Moreover, bleaching properties of the acidic clays used as catalysts ensure markedly lighter colouring for the compositions in comparison with compositions prepared using $AlCl_3$. Commercial catalysts as efficient solid catalysts are Fuller clays—Fulcat 22B, Fulmont 237, clays based on montmorillonite KSF, K10, catalyst Süd Chemie K5 and acid activated clays based on bentonite, but also natural acidic clay Zikijevská opoka.

Their advantage, compared with $AlCl_3$, consists in the possibility of simple separation from the reaction mixture by filtration and in utilization of their bleaching properties, whereby considerably lighter product is obtained than with $AlCl_3$.

Production of the compositions can be performed by discontinuous, continuous or possibly semicontinuous method.

Examples below further illustrate, but do not limit the invention subject.

EXAMPLES OF INVENTION EMBODIMENTS

Example 1

100 g of diphenylamine (DFA) melt were charged in a glass reactor, equipped with an agitator, a cooler with an azeotropic attachment, separating funnel and a thermometer. Then 30 g of a catalyst based on bentonite Nobelin FF (30% by weight, as referred to DFA) were added. After mixing up the catalyst the mixture was heated to a temperature of 160° C. and during 5 hours 397 g of diisobutylene were uniformly added. During the first hour from the beginning of adding diisobutylene water originating from the catalyst was azeotropically distilled off.

After all diisobutylene was used, the reaction mixture was left to react for another 14 hours. After the reaction was completed, catalyst was left to settle and the mixture was decanted. After diisobutylene was distilled off, a composition was obtained which contained 70.2% by weight of dioctyidiphenylamine, 25.8% by weight of monooctyidiphenylamine, 2.8% by weight of octylbutyidiphenylamine, 0.5% by weight of trioctyldiphenylamine, 0.4% by weight of diphenylamine. The rest to 100% by weight consisted of cleavage products of diisobutylene (DIB).

Example 2—Comparative

Into the apparatus from Example 1, there were added 0.2 mol of $AlCl_3$ to 1 mol of diphenylamine melt. The mixture was heated to 115° C. All diisobutylene was fed at this temperature and after having the catalyst removed and the unreacted diisobutylene distilled off, after 6 hours reaction mixture was obtained, which contained 66.2% by weight of dioctyldiphenylamine, 25.4% by weight of monooctyldiphenylamine, 0.2% by weight of octylbutyldiphenylamine, 1.79% by weight of trioctyldiphenylamine and 3.3% by weight of diphenylamine. The rest consisted of cleavage products of DIB as well.

Example 3—Comparative

Into the apparatus from Example 1 with the amount of diphenylamine melt as in Example 2, there were added 0.25 mol of $AlCl_3$. The mixture was heated to 115° C. All diisobutylene was fed at this temperature. After removing catalyst and distilling off the unreacted diisobutylene and after the reaction was completed, reaction mixture was obtained, which contained 67.3% by weight of dioctyldiphenylamine, 23.1% by weight of monooctyidiphenylamine, 0.3% by weight of octylbutyldiphenylamine, 2.2% by weight of trioctyidiphenylamine and 2.7% by weight of diphenylamine.

Example 4

Into the apparatus from Example 1 with the amount of raw stock as in Example 1, diphenylamine melt was charged, and to the used catalyst from Example 1 20% by weight of new catalyst Nobelin FF were added, as referred to the amount of catalyst from the first batch. The mixture was heated to a temperature of 140° C. and in the course of 5 hours diisobutylene was added. After 21 hours the reaction was stopped and the mixture was processed as in Example 1. The obtained composition contained 65.8% by weight of dioctyldiphenylamine, 29.1% by weight of monooctyldiphenylamine, 2.0% by weight of octylbutyidiphenylamine, 0.3% by weight of trioctyldiphenylamine and 0.4% by weight of diphenylamine.

The catalyst was used in further experiments 9 times on the whole after charging new starting materials and adding each time 30% by weight of new catalyst, wherein Nobelin FF was replaced by Nobelin GF after the fourth addition of 30% of new catalyst to the used catalyst. After 21 hour reaction the resulting composition contained 70.86% by weight of dioctyidiphenylamine, 21.5% by weight of monooctyldiphenylamine, 2.2% by weight of octylbutyldiphenylamine, 0.5% by weight of trioctyldiphenylamine and 0.2% by weight of diphenylamine.

After the ninth repeated use of the catalyst and addition of new catalyst the obtained composition contained 66.0% by weight of dioctyidiphenylamine, 28.0% by weight of monooctyldiphenylamine, 2.0% by weight of octylbutyldiphenylamine, 0.33% by weight of trioctyldiphenylamine and 0.2% by weight of diphenylamine.

Example 5

Into the apparatus from Example 1 with the amount of diphenylamine melt as in Example 1, there were added 15 g of the catalyst Fulcat 22 (15% by weight, as referred to DFA). After mixing up the catalyst the mixture was heated to a temperature of 160° C. and in the course of 10 hours 397 g of diisobutylene were uniformly added. During the first hour from the beginning of adding diisobutylene water originating from the catalyst was azeotropically distilled off. After 18 hours the reaction was stopped and the mixture was processed as in Example 1.

The obtained reaction mixture contained 68.5% by weight of dioctyldiphenylamine, 24.9% by weight of monooctyldiphenylamine, 4.9% by weight of octylbutyldiphenylamine, 1.4% by weight of trioctyldiphenylamine and 0.3% by weight of diphenylamine.

Example 6

Into the apparatus from Example 1, diphenylamine melt in an amount as in Example 1 was charged and 20 g of the catalyst Jeltar 300 (20% by weight, as referred to DFA) were added. After mixing up the catalyst the mixture was heated to a temperature of 140° C. and in the course of 5 hours diisobutylene was uniformly added. During the first hour water originating from the catalyst was azeotropically distilled off and after 28 hours the reaction was stopped and the mixture was processed as in Example 1.

The obtained reaction mixture contained 67.9% by weight of dioctyldiphenylamine, 28.7% by weight of monooctyldiphenylamine, 1.3% by weight of octylbutyldiphenylamine, 0.2% by weight of trioctyldiphenylamine and 0.4% by weight of diphenylamine.

Example 7

Into the apparatus from Example 1 with the amount of diphenylamine and diisobutylene as in Example 1 diphenylamine melt was charged and 20 g of the catalyst K5 Süd Chemie (20% by weight, as referred to DFA) were added. After mixing up the catalyst the mixture was heated to a temperature of 140° C. and during 5 hours diisobutylene was uniformly added. During the first hour water originating from the catalyst was azeotropically distilled off, after 21 hours the reaction was stopped and the mixture was processed as in Example 1.

The obtained composition contained 69.8% by weight of dioctyldiphenylamine, 25.0% by weight of monooctyldiphenylamine, 1.0% by weight of octylbutyldiphenylamine, 0.3% by weight of trioctyldiphenylamine and 0.2% by weight of diphenylamine.

Example 8

From the reaction mixture of Example 1 the catalyst was removed by decantation and unreacted diisobutylene was distilled of from the liquid phase at a temperature of 103 to 107° C. and a pressure of 101 kPa (alternatively at a temperature of 68° C. and a pressure of 20 kPa).

The obtained mixture was subsequently adjusted to the desired chemical composition by rectification of light fractions on a packed column at a temperature of 148 to 153° C. and a pressure of 8 to 10 Pa. The required composition, formed by the distillation residue, was obtained, which contained 84.3% by weight of dioctyldiphenylamine, 9.9% by weight of monooctyldiphenylamine, 1.6% by weight of octylbutyldiphenylamine, 0.5% by weight of trioctyidiphenylamine and 0.01% by weight of diphenylamine.

Example 9

Antioxidant composition prepared according to Example 1 was adjusted to the required chemical composition by crystallization from the reaction mixture according to Examples 1 to 8 in methanol, ethanol, isopropanol, cyclohexanol, cyclohexane and/or diisobutylene so that 100 ml of solvent were added to it with stirring at a temperature of 50° C., and after cooling to 10° C. the mixture has crystallized. The crystalline product was filtered off and dried.

Chemical composition of the compositions crystallized from various solvents is given in Table I.

TABLE I

Chemical composition of antioxidant compositions after crystallization

| Composition [% by weight] | Solvent | | | | | |
|---|---|---|---|---|---|---|
| | Methanol | Ethanol | Iso-propanol | Cyclo-hexanol | Cyclo-hexane | Diiso-butylene |
| Dioctyldiphenylamine | 96.7 | 84.8 | 78.9 | 83.0 | 72.9 | 92.1 |
| Monooctyldiphenylamine | 1.8 | 12.2 | 18.4 | 12.4 | 23.1 | 4.9 |
| Octylbutyldiphenylamine | 0.8 | 0.8 | 0.9 | 2.1 | 0.7 | 1.6 |
| Octylbutyldiphenylamine | 0.1 | 0.1 | 0.1 | 0.1 | 0.1 | 0.1 |
| Diphenylamine | 0.01 | 0.1 | 0.2 | 0.1 | 0.2 | 0.05 |

Example 10

100 ml of methanol were added to 60 g of the reaction product from Example 4. The obtained suspension was heated to a temperature of 60° C. and filtered at 10° C. After washing the filter cake by methanol, there was obtained distillation residue having the following composition: 93.8% by weight of dioctyldiphenylamine, 3.8% by weight of monooctyldiphenylamine, 1.8% by weight of octylbutyldiphenylamine, 0.3% by weight of trioctyldiphenylamine and 0.0% by weight of diphenylamine.

Example 11

200 g of the reaction mixture from Example 6 were charged into the distillation apparatus, the mixture was heated and at a temperature of 240° C. and atmospheric pressure dimer of diisobutylene was distilled off, and at a temperature of 175° C. and the pressure of 20 kPa diphenylamine with a part of monooctyldiphenylamine was distilled off in such a way that distillation residue was obtained having the following composition: 92.6% by weight of dioctyldiphenylamine, 2.5% by weight of monooctyldiphenylamine, 1.8% by weight of octylbutyldiphenylamine, 0.3% by weight of trioctyldiphenylamine and 0.0% by weight of diphenylamine.

After cooling down to a temperature of 150° C. and decreasing pressure to 10 kPa another 10 g of octylbutyldiphenylamine and monooctyldiphenylamine mixture were distilled off. After adding equimolar mixture of ethanol, isopropanol, cyclohexanol, cyclohexane, diisobutylene and methanol in an amount of 10 g the mixture was tempered to 60° C., cooled down to 20° C. and filtered. The obtained filter cake had the following composition: 97.5% by weight of dioctyldiphenylamine, 0.9% by weight of monooctyldiphenylamine, 0.9% by weight of octylbutyldiphenylamine, 0.2% by weight of trioctyidiphenylamine, 0.01% by weight of diphenylamine.

Example 12

The antioxidant compositions of octylated diphenylamines from Examples 2, 8, and 11 were used in a concentration of 2 weight parts/100 parts of rubber to stabilize natural rubber. These antioxidant compositions under the designation DODFA 1, DODFA 2, DODFA 3 and the other antioxidants—Dusantox 86 and TMQ (Flectol) were admixed to a carbon black filled NR base (SMR5, Vulkán 3, ZnO, stearin).

The course of thermooxidative aging of vulcanizates prepared and stabilized in this way was monitored based on the change of basic physico-mechanical properties of sample pieces vulcanised at a temperature of 145° C. using the method according to ISO 3417 during 5 to 12 days in air stream at a temperature of 70° C. The results are given in Table II.

TABLE II

Physico-mechanical properties of vulcanizates before and after thermooxidative aging (70° C.)

| | Without antiox. | 1 | 2 | 3 | 4 | 5 | Time [day] |
|---|---|---|---|---|---|---|---|
| Modulus of | 2.6 | 2.4 | 2.4 | 2.4 | 2.3 | 2.4 | 0 |
| elongation | 2.8 | 3.5 | 3.7 | 4.0 | 3.9 | 3.7 | 5 |
| 100% [MPa] | 2.6 | 3.5 | 3.5 | 3.4 | 3.6 | 3.3 | 7 |
| | 3.0 | 3.6 | 3.6 | 3.7 | 3.8 | 3.5 | 12 |
| Modulus of | 7.0 | 6.5 | 6.2 | 6.4 | 6.2 | 6.3 | 0 |
| elongation | 6.8 | 9.5 | 10.1 | 10.8 | 10.7 | 10.3 | 5 |
| 200% [MPa] | | 9.4 | 9.6 | 9.2 | 9.7 | 9.0 | 7 |
| | | 9.6 | 9.7 | 9.4 | 10.4 | 9.5 | 12 |
| Modulus of | 13.3 | 12.4 | 10.2 | 12.2 | 11.9 | 18.1 | 0 |
| elongation | 11.7 | 16.8 | 17.8 | 18.7 | 18.9 | 18.2 | 5 |
| 300% [MPa] | | 16.2 | 16.4 | 15.3 | 16.8 | 15.6 | 7 |
| | | | | | | | 12 |
| Tensile | 29.7 | 28.5 | 28.0 | 28.3 | 29.4 | 28.3 | 0 |
| Strength | 13.9 | 23.4 | 25.4 | 23.2 | 25.9 | 24.9 | 5 |
| [MPa] | 6.0 | 19.2 | 19.0 | 19.6 | 20.1 | 18.7 | 7 |
| | 3.41 | 11.8 | 12.3 | 13.3 | 16.5 | 12.0 | 12 |
| Elongation | 530 | 534 | 532 | 530 | 551 | 532 | 0 |
| at break | 365 | 394 | 405 | 357 | 393 | 390 | 5 |
| [MPa] | 179 | 348 | 349 | 358 | 358 | 351 | 7 |
| | 110 | 234 | 237 | 253 | 284 | 240 | 12 |

Antioxidants used:
1. DODFA 1 - composition according to Example 2
2. DODFA 2 - composition according to Example 8
3. DODFA 3 - composition according to Example 11
4. TMQ - polymerised 2,2,4-trimethyl-1,2-dihydrochinoline
5. Dusantox 86 - 4-(1,1-dimethylbenzyl)-diphenylamine and 4,4'-(1,1-dimethylbenzyl)-diphenylamine

TABLE III

Resistance of vulcanizates against dynamical stress before and after thermooxidative aging (3 days at 100° C.)

| | Number of cycles [kc] | |
|---|---|---|
| Sample | 0 days | 3 days/100° C. |
| Without antioxidant | 12.3 | 5.1 |
| DODFA 1 | 17.5 | 14.27 |
| DODFA 2 | 16.9 | 13.17 |
| DODFA 3 | 17.17 | 13.53 |
| TMQ | 17.87 | 11.78 |
| Dusantox 86 | 16.97 | 13.10 |

Legend:
kc - kilocycles

From the given results, there is obvious the antioxidative effect of the composition of octylated diphenylamines which increases at longer exposition time.

INDUSTRIAL APPLICABILITY

Mixtures of octylated diphenylamines can be utilized in chemical, rubber and oil industry to stabilize polymeric materials, lubricants, oils and fuels.

The invention claimed is:

1. Antioxidative composition on the basis of diphenylamine, characterized in that it contains
    72.9 to 98% by weight of dioctyldiphenylamine,
    up to 29% by weight of monooctyldiphenylamine,
    up to 5% by weight of octylbutyldiphenylamine,
    0.1 to 1.5% by weight of trioctyldiphenylamine and
    up to 1% by weight of diphenylamine.

2. Antioxidative composition according to claim 1, characterized in that it contains
    83 to 89% by weight of dioctyldiphenylamine,
    7 to 13% by weight of monooctyldiphenylamine,
    0. 8 to 4% by weight of octylbutyldiphenylamine,
    0.1 to 1.5% by weight of trioctyldiphenylamine and
    0.1 to 1% by weight of diphenylamine.

3. Mixture for preparation of stabilized polymeric materials characterized in that it contains at least one antioxidant composition according to claim 2.

4. Antioxidative composition according to claim 1, characterized in that it contains
    92 to 94.5% by weight of dioctyldiphenylamine,
    2.5 to 4.5% by weight of monooctyldiphenylamine,
    1.4 to 2% by weight of octylbutyldiphenylamine,
    0.3 to 1% by weight of trioctyldiphenylamine and
    up to 0.5% by weight of diphenylamine.

5. Mixture for preparation of stabilized polymeric materials, characterized in that it contains at least one antioxidant composition according to claim 4.

6. Antioxidative composition according to claim 1, characterized in that it contains
    96 to 98% by weight of dioctyldiphenylamine,
    0.6 to 2.1% by weight of monooctyldiphenylamine,
    0.8 to 1.1% by weight of octylbutyldiphenylamine,
    0.1 to 0.5% by weight of trioctyldiphenylamine and
    up to 0.3% by weight of diphenylamine.

7. Mixture for preparation of stabilized polymeric materials, characterized in that it contains at least one antioxidant composition according to claim 6.

8. Mixture for preparation of stabilized polymeric materials characterized in that it contains at least one antioxidant composition according to claim 1.

9. Method of preparation of antioxidant composition of claim 1 on the basis of diphenylamine by catalytic alkylation of diphenylamine by an excess of diisobutylene in the presence of an alkylation catalyst, characterized in that the catalytic alkylation of diphenylamine is performed with threefold excess at most of diisobutylene with regard to diphenylamine in the presence of acidic clay as a catalyst in an amount of 5 to 30% by weight, as referred to diphenylamine, at a temperature of 140 to 160° C., while water contained in the catalyst, is removed and subsequently diphenylamine is left to complete the reaction with diisobutylene and after the reaction is finished, the reaction mixture is separated from the catalyst, unreacted diisobutylene is removed from it and the reaction product is obtained.

10. Method of preparation according to claim 9, characterized in that the catalytic alkylation of diphenylamine is performed at atmospheric pressure.

11. Method of preparation according to claim 9, characterized in that the catalytic alkylation of diphenylamine is performed at overpressure of up to 0.6 MPa.

12. Method of preparation according to claim 9, characterized in that the catalytic alkylation of diphenylamine is performed in the course of 18 to 28 hours.

13. Method of preparation according to claim 9, characterized in that the catalytic alkylation of diphenylamine is performed in the presence of a catalyst chosen from the group including Nobelin FF, Nobelin GF, Jeltar 100, Jeltar 300, catalyst K5, K10 Süd Chemie, Fulcat 22B.

14. Method of preparation according to claim 9 characterized in that the unreacted diisobutylene and possibly present low boiling components are removed by azeotropic distillation.

15. Method of preparation according to claim 9, characterized in that the catalyst is reused after separation from the reaction medium or without its separation in a further batch with or without addition of new catalyst, wherein the catalyst is used in the second to ninth batch and the amount of new catalyst added is from 0.01 to 70% by weight, as referred to the catalyst charge in the first alkylation batch.

16. Method of preparation according to claim 9, characterized in that the reaction product is further processed by rectification on a packed column at a temperature of 148 to 153° C. and a pressure of 8 to 10 Pa.

17. Method of preparation according to claim 9 characterized in that the reaction product is left to crystallize from a solvent chosen from the group including ethanol, isopropanol, cyclohexanol, cyclohexane, diisobutylene and methanol, or from a mixture of these solvents.

18. Method of preparation according to claim 9, characterized in that the reaction product is extracted by one or more solvents chosen from the group including ethanol, isopropanol, cyclohexanol, cyclohexane, diisobutylene and methanol.

* * * * *